S. C. BRINSER.
Horse Hay-Rake.
No. 83,452.
Patented Oct. 27, 1868.
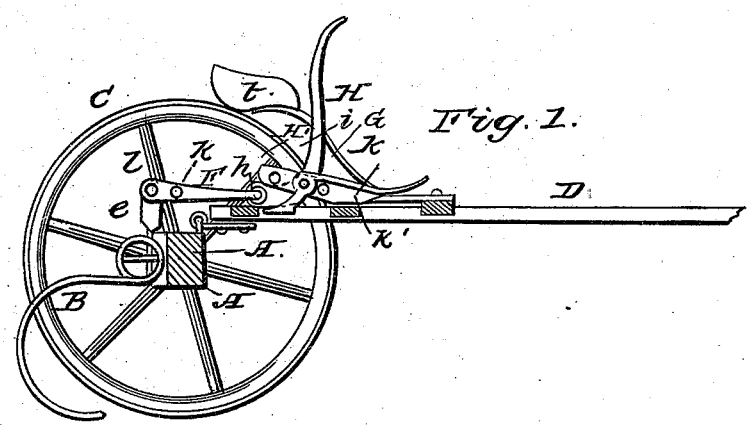
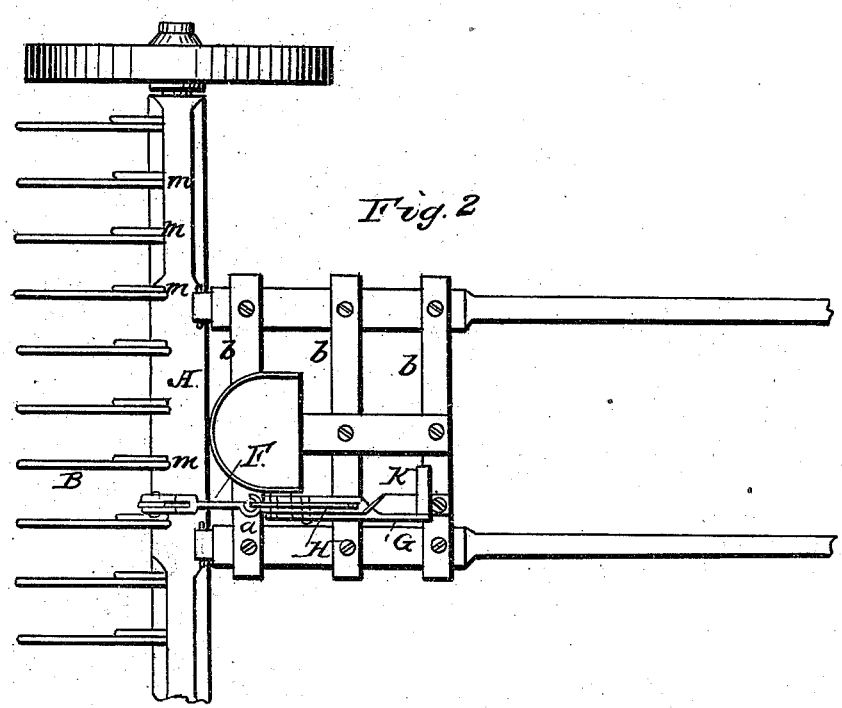
Witnesses
C. A. Pettet
S. C. Kenon
Inventor
S. C. Brenson
By Munn & Co
Attorneys

UNITED STATES PATENT OFFICE.

S. C. BRINSER, OF MIDDLETOWN, PENNSYLVANIA.

IMPROVEMENT IN HORSE-RAKES.

Specification forming part of Letters Patent No. 83,452, dated October 27, 1868.

*To all whom it may concern:*

Be it known that I, S. C. BRINSER, of Middletown, in the county of Dauphin and State of Pennsylvania, have invented a new and Improved Horse Hay-Rake; and I do hereby declare that the following is a full, clear, and exact description of the construction and operation of the same, reference being had to the accompanying drawings, making a part of this specification, in which—

Figure 1 is a side elevation of my invention, one wheel and a portion of the axle being removed; and Fig. 2 is a plan view.

This invention consists in locking the head of a horse hay-rake by means of a simple toggle arrangement in such a manner that it cannot rotate to any degree upon its bearings, but is compelled to bear the teeth steadily forward without change of elevation, as in raking over even ground; also, in connecting the before-mentioned locking mechanism into an arrangement of parts for tripping the rake-head to avoid stones or the roughness of uneven surface, said tripping arrangement being operated by means either of a hand or foot lever.

In the drawings, A represents an axle; B, rake-teeth rigidly attached to the same; C, wheels; D, thills.

The mechanism for locking the rake-head, which is the axle, consists of an arm, E, projecting vertically from the rear side of said axle, to the upper end of which are pivoted the forks of a bifurcated arm, F, one on each side, the arm F terminating in a hook, $a$, inserted in the rear end of a toggle-lever, H, said lever being pivoted between the forks of a bifurcated arm, K, rigidly attached, just at the right of the driver's seat O, to the cross-beams $b\ b\ b$ laid on the thills D.

To lock the head it is only necessary to depress the lever H far enough to bring the points $e$, $h$, and $i$ into line. It will then be found impossible to rotate the axle A upon its bearings, and the teeth B will be borne along evenly, as is expedient in passing over levee fields.

To unlock the rake-head it is only necessary to elevate the long arm of the lever H, which throws the point $h$ out of line with the points $i$ and $e$, and draws the arm F forward, thus rotating the rake-head on its bearings and elevating the teeth. When fully elevated, the lever H is somewhat in rear of the driver's seat I, and may be conveniently depressed again by the use of a foot-lever, G, pivoted at the same point with the hand-lever, and bent at its rear end into a sort of stirrup, which passes under the rear end of the hand-lever and rests against it.

The arm F is provided with two or more holes, $k$, through either of which the arm E may be pivoted; and the arm K is likewise provided with three or more holes, $k'$, through either of which the levers G and H may be pivoted.

To prevent the lever H from accidentally locking the head, a pin, $k''$, may be passed through the rearmost hole of the arm K.

In locking, to prevent the lever H from being too far depressed, a stop may be placed at the junction of the fork of the bifurcated arm K'.

Having thus described my invention, what I claim as new, and desire to secure by Letters Patent, is—

The combination and arrangement of the lever H, curved as described and shown, with the connecting-rod F, having a series of holes in its rear end, the frame K, having the series of holes $k'$, the arm E, and the rake-teeth B B, when the said parts are so constructed and combined together as to operate in connection with a pin in the frame K, substantially in the manner described.

S. C. BRINSER.

Witnesses:
JNO. JOS. WALBORN,
PETER BRESTEL.